United States Patent
Lafond

(10) Patent No.: US 8,771,505 B2
(45) Date of Patent: Jul. 8, 2014

(54) CATCH BASIN TRAP AND MOUNTING SYSTEM

(75) Inventor: Roch Lafond, Burritts Rapids (CA)

(73) Assignee: PVC Industrial Products Ltd. (CA)

( * ) Notice: Subject to any disclaimer, the term of this patent is extended or adjusted under 35 U.S.C. 154(b) by 217 days.

(21) Appl. No.: 13/171,982

(22) Filed: Jun. 29, 2011

(65) Prior Publication Data

US 2011/0315616 A1    Dec. 29, 2011

(30) Foreign Application Priority Data

Jun. 29, 2010 (CA) .................................... 2708713

(51) Int. Cl.
*E03F 5/04* (2006.01)
*E03F 5/16* (2006.01)
*B01D 21/24* (2006.01)
*C02F 103/00* (2006.01)

(52) U.S. Cl.
CPC ................ *E03F 5/16* (2013.01); *E03F 5/0403* (2013.01); *C02F 2103/001* (2013.01); *B01D 21/2444* (2013.01); *B01D 2221/12* (2013.01)
USPC ............... 210/170.03; 210/232; 210/532.1; 210/538; 404/4; 137/247.35

(58) Field of Classification Search
USPC ......... 210/162, 163, 164, 170.03, 232, 532.1, 210/538; 404/4, 5; 137/247.11, 247.31, 137/247.35

See application file for complete search history.

(56) References Cited

U.S. PATENT DOCUMENTS

| | | | | |
|---|---|---|---|---|
| 468,157 | A | * | 2/1892 | Shapley ................... 137/247.11 |
| 1,634,871 | A | * | 7/1927 | Hepler .......................... 210/538 |
| 1,793,599 | A | * | 2/1931 | Egan .......................... 210/170.03 |
| 3,789,987 | A | * | 2/1974 | Malaspina ..................... 210/232 |
| 4,432,384 | A | | 2/1984 | Guiboro |
| 6,126,817 | A | | 10/2000 | Duran et al. |
| 6,132,603 | A | * | 10/2000 | Mokrzycki et al. ...... 210/170.03 |
| 7,686,961 | B1 | * | 3/2010 | Glynne .................... 210/170.03 |
| 8,017,004 | B2 | * | 9/2011 | Crumpler ...................... 210/162 |

* cited by examiner

*Primary Examiner* — Christopher Upton
(74) *Attorney, Agent, or Firm* — Gerald E. Hespos; Michael J. Porco; Matthew T. Hespos

(57) ABSTRACT

A trap for a catch basin, and means for mounting said trap to a catch basin wall, comprises a hollow trap body having an inner wall and an outer wall, and side walls joining the inner and outer walls. The trap body has a first aperture near the top of its inner wall, allignable with an outlet of a catch basin, and a second aperture at a lower level on said trap body than said first aperture. A mounting plate is secured to the inner wall of the trap body, and has an aperture allignable with the first aperture of the trap body. A retainer plate is provided, onto which the mounting plate can be mounted. The retainer plate also has an aperture allignable with the apertures on the mounting plate and trap body.

10 Claims, 7 Drawing Sheets

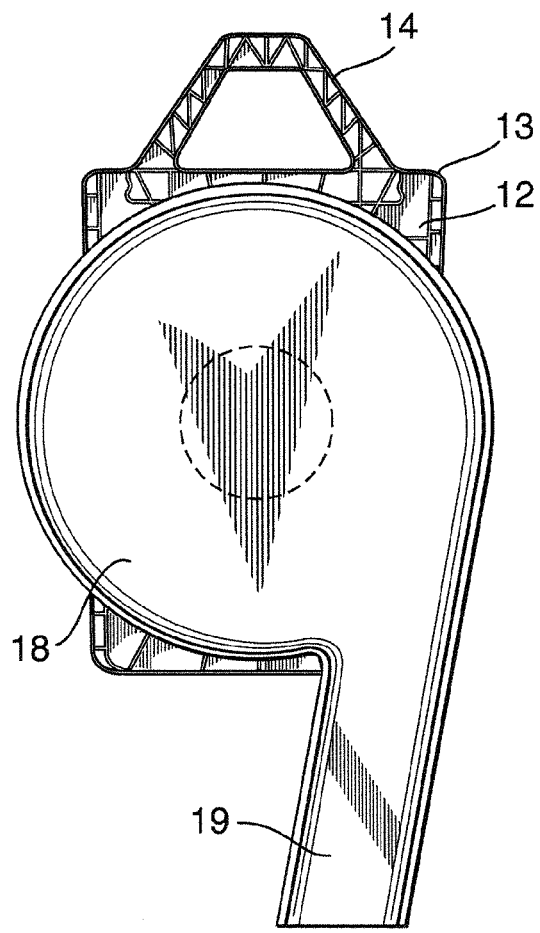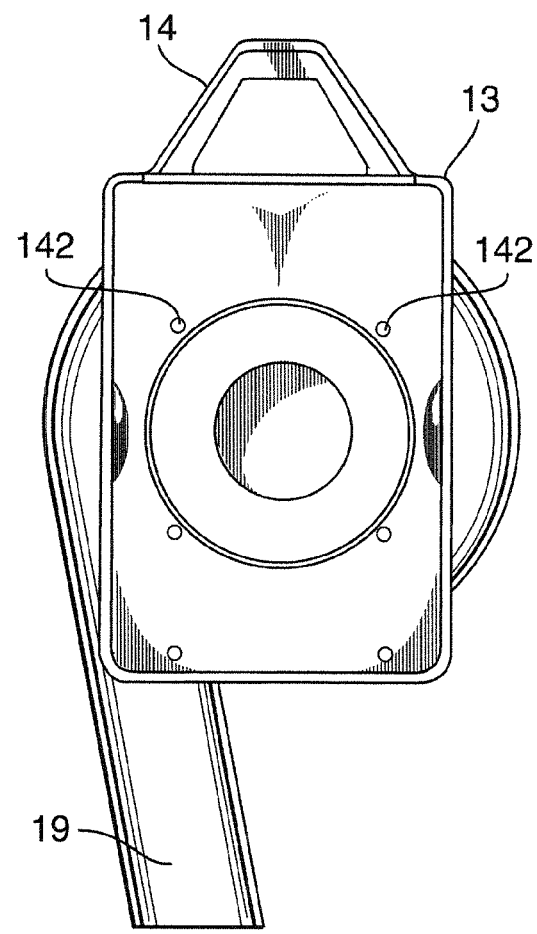
FIG. 6  FIG. 7
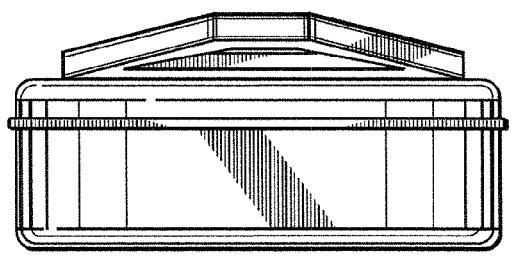
FIG. 8

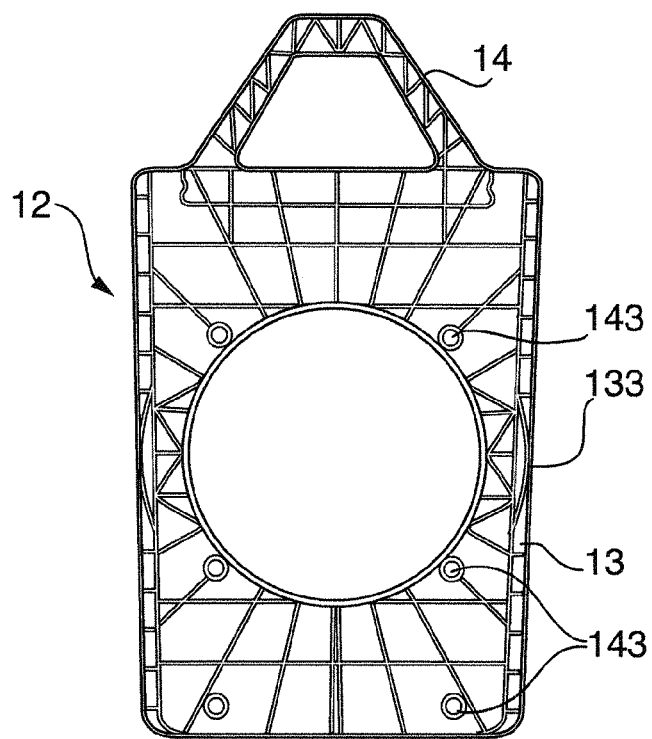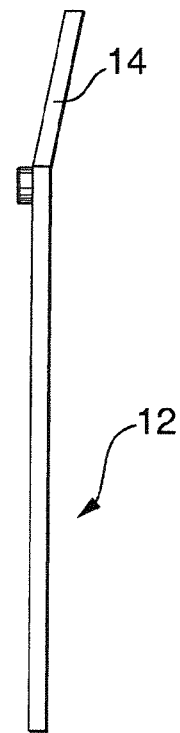
FIG. 11  FIG. 12
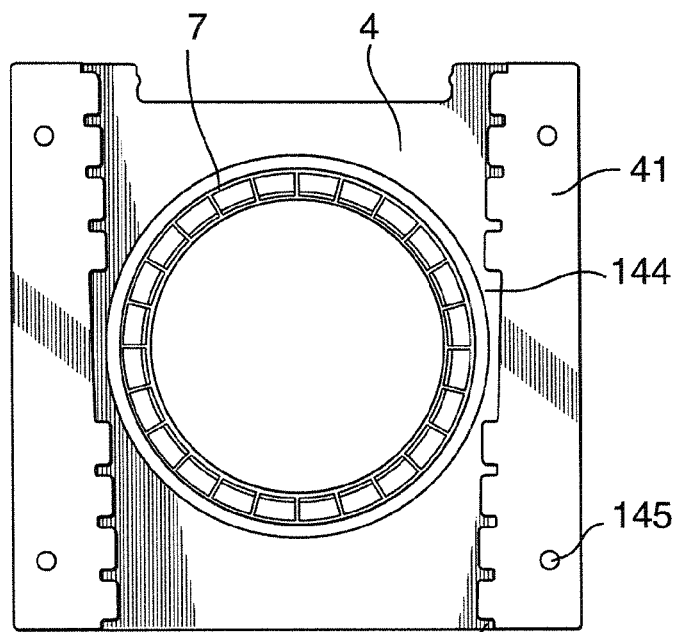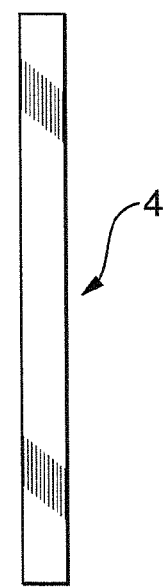
FIG. 13  FIG. 14

CATCH BASIN TRAP AND MOUNTING SYSTEM

BACKGROUND OF THE INVENTION

1. Field of the Invention

The present invention relates to the field of storm sewers and catch basins. In particular, the present invention provides a trap for use in the catch basins of storm sewers. The trap of the present invention includes a novel bracket for attachment to a catch basin. The present invention also comprises an inlet flow device utilizing a similar bracket.

2. Description of the Related Art

In a storm sewer system, water, and a large amount of debris, enters the system through grated sewer inlets in streets. At each inlet is located a catch basin. The catch basin is essentially a concrete (or other material) vault into which all water from a street flows when it rains. At a given height above the floor of the catch basin, storm sewer lines communicate with the catch basin, carrying water downstream in the system and exiting the catch basin in a downstream direction.

A sewer fluid trap is shown in the U.S. Pat. No. 4,430,384, comprising a rigid plate for fastening to the wall of a catch basin around the sewer outlet, and a downwardly bent elbow that can be inserted in a bracket formed on the rigid plate, to act as a trap. This fluid trap relies on a precise gas tight fit between the plate and the elbow to prevent the escape of gas from the trap. Moreover, since it utilizes a downwardly oriented elbow, a substantial portion of floatable debris in the catch basin will enter the storm sewer.

It is also known to provide a catch basin trap in the form of a downwardly directed hood, such as that shown in U.S. Pat. No. 6,126,817. That patent shows a plastic hood with a downwardly oriented opening, for attachment to the wall of a catch basin. The hood is attached by a series of bolts to the side wall of the catch basin, with the opening of the hood being located below the level of a storm sewer. A gasket is placed between the hood and the wall of the catch basin, to render the attachment of the hood to the catch basin water-tight and gas impermeable. In its most basic form, the hood has a downwardly directed opening, which can admit floatable debris into a storm sewer. A drawback of the U.S. Pat. No. 6,126,817 hood is that it is difficult to mount and demount from a catch-basin wall, as it is bolted thereto.

The present Applicant is also the owner of co-pending Canadian Patent Application No. 2,708,713, in respect of a Catch Basin Trap particularly well suited for use with catch basins having flat planar walls. However, a large number of catch basins are constructed as cylinders, with curved walls. An object of the present invention, therefore, is to provide catch basin traps that can be effectively emplaced on a catch basin with a curved interior wall.

SUMMARY OF THE INVENTION

In a broad aspect, the present invention relates to a trap for a catch basin, and means for mounting said trap to a catch basin wall, comprising: a hollow trap body having an inner wall and an outer wall, and side walls joining said inner and outer walls, said trap body having a first aperture near the top of its inner wall, allignable with an outlet of said catch basin, and a second aperture at a lower level on said trap body than said first aperture; a mounting plate secured to the inner wall of said trap body, and having an aperture allignable with the first aperture of said trap body; a retainer plate onto which said mounting plate can be mounted, said retainer plate having an aperture allignable with the aperture on said mounting plate.

The mounting plate preferably has side edges that converge slightly from top to bottom, and said retainer plate has a wide channel formed in its outer surface to accommodate said mounting plate.

The side edges of said mounting plate and the inner edges of said channel formed in said retainer plate may have complementary shaped profiles, whereby said mounting plate can frictionally engage said channel of retainer plate to remain attached thereto.

Moreover, the mounting plate may have an upper end shaped to fit in a recess formed in said retainer plate. The mounting plate may have a handle at its upper end, and the retainer plate is preferably provided with preformed bolt holes for attaching said retainer plate to a wall of a catch basin, and a gasket on its inner surface.

A gasket may be provided between said retainer plate and said mounting plate, around the aperture formed in said retainer plate.

The present invention also provides an adaptor for connection to said retainer plate, said adaptor comprising a curved panel having a radius of curvature selected to match the radius of curvature of the inside surface of catch basin, and a cylindrical collar extending rearwardly from said curved panel, to the aperture in a retaining plate, said collar being welded around its perimeter to the inner edge of said aperture in said retaining plate. The collar may provided with stiffening ribs on its outer surface.

Preferably, the curved panel of said adaptor is provided with a gasket on its inner surface, and bolt holes for attachment to a catch basin.

The trap body of the present invention may be box-shaped, with said second aperture located on the outer surface of said trap body.

The trap body may be circular, with said second aperture located at the lower end of a tubular member extending at an incline downwardly therefrom, at a tangent to a side edge of said body.

BRIEF DESCRIPTION OF THE DRAWINGS

FIG. 6 is a front view of a second embodiment of a catch basin trap according to the present invention.

FIG. 7 is a rear view of the trap shown in FIG. 6.

FIG. 8 is a top view of the trap shown in FIG. 6.

FIG. 11 is a front view of a mounting plate.

FIG. 12 is a side view of the mounting plate of FIG. 11.

FIG. 13 is a front view of a retainer plate.

FIG. 14 is a side view of a retainer plate.

DETAILED DESCRIPTION OF THE PREFERRED EMBODIMENTS

Figure 1:
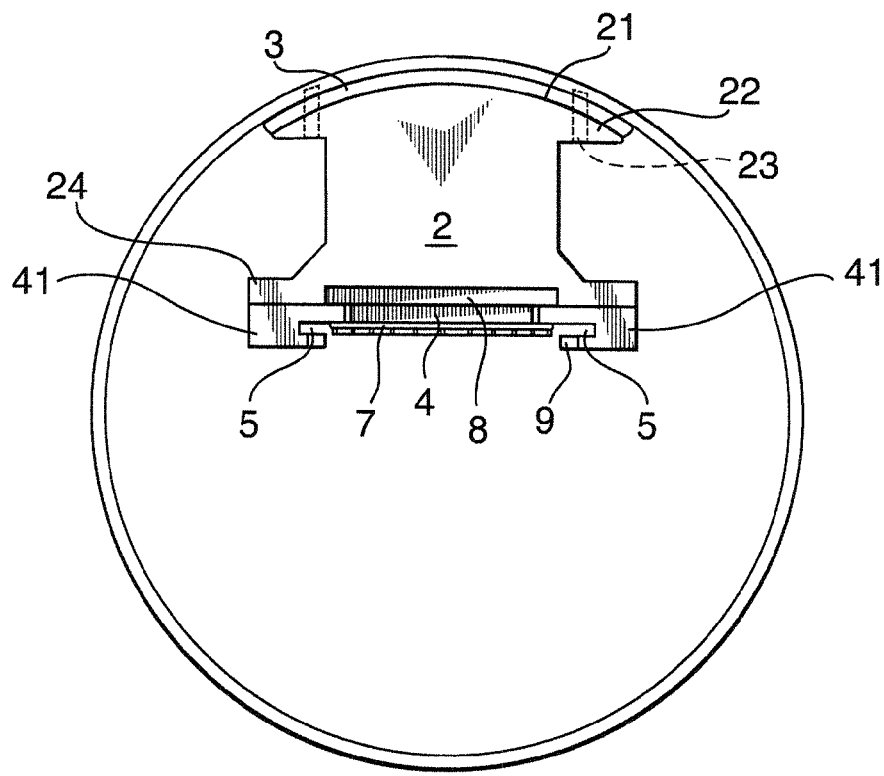
FIG. 1 is a top view of a catch basin wall mount for a catch basin trap according to the present invention.
Figure 2:
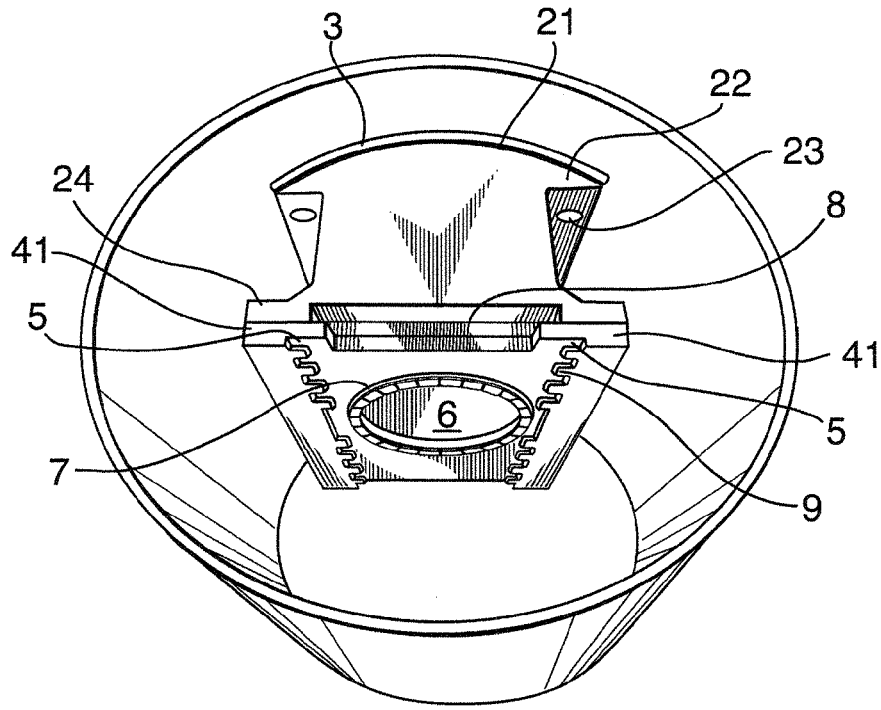
FIG. 2 is a perspective view of the mount shown in FIG. 1.

Referring to FIGS. 1 and 2, a mount 1 is for use in a cylindrical catch basin is illustrated. The mount 1 comprises a block body 2 fabricated from a plastic material such as high-density polyethylene. The block body 2 has a front surface 21 that is curved to fit against the curved wall of a catch basin. The front surface is provided with an inner gasket 3 to prevent water from leaking between the front surface 21 of the block body and the wall of a catch basin. The inner portion of the block body extends outwardly to define flanges 22 that are provided with bolt holes 23. Bolt holes 23 are provided so that the mount 1 can be bolted to the inner wall of a catch basin by means of bolts embedded in the wall of the catch basin. The bolts should be stainless steel, to avoid rusting with the heads thereof held in countersunk blind bores in the wall of the catch basin wall by epoxy or waterproof grout. A simple way of locating appropriate positions of such blind bores is to provide a jig in the shape of the front surface 21 of block body 2, with holes to indicate the position and appropriate axial alignment of blind bores.

The outer portion of block body 2 is provided with an outer wall 24, which may be wider than the central part of block body 2. Outer wall 24 serves as a mounting surface for a retainer plate 4 that is affixed thereto by any appropriate means, such as threaded fasteners, rivets, heat welding, or waterproof adhesives.

Retainer plate 4 is generally rectangular, with a pair of side walls 41, each of which has an inwardly facing groove 5. Groove 5 may be smooth, textured or, as shown, composed of a row of inwardly facing teeth 9. The function of groove 5 is to provide a track that is complementary to a profiled edge 13 on the mounting plate 12 of a catch basin trap 10. There is a central aperture in the retainer plate 4 that extends through the block body 2, and aligns with the outflow aperture of a catch basin.

A gasket 7, such as an O-ring is provided in a gasket seat formed in retainer plate 4, around the central aperture.

Figure 3:
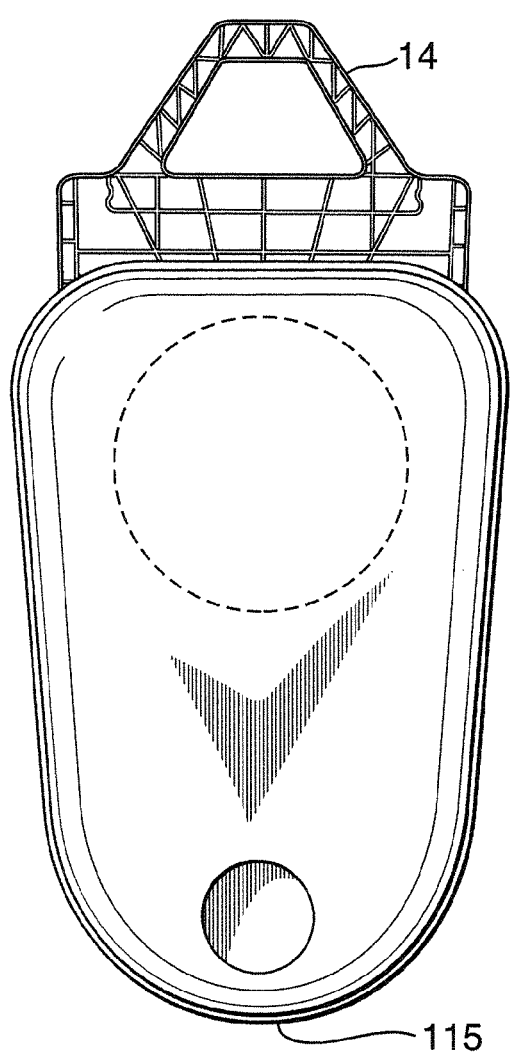
FIG. 3 is a front view of a first embodiment of a catch basin trap according to the present invention.
Figure 5:
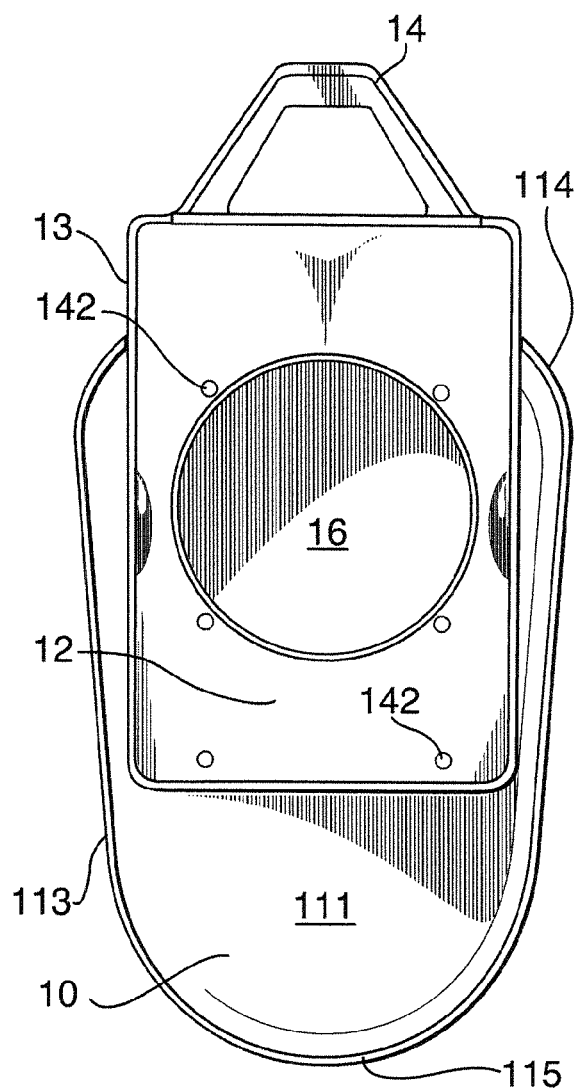
FIG. 5 is a rear view of the trap shown in FIG. 3.
Figure 4:
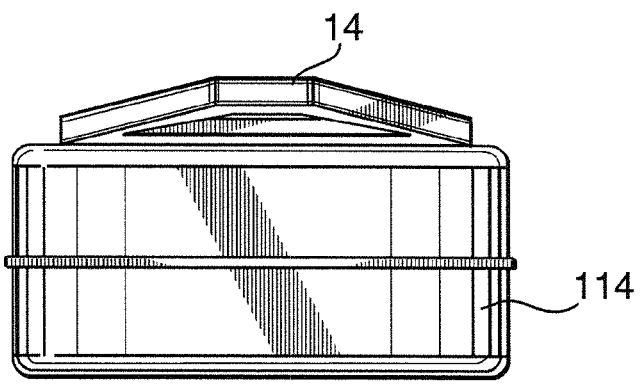
FIG. 4 is a top view of the catch basin trap shown in FIG. 3.
Figure 9:
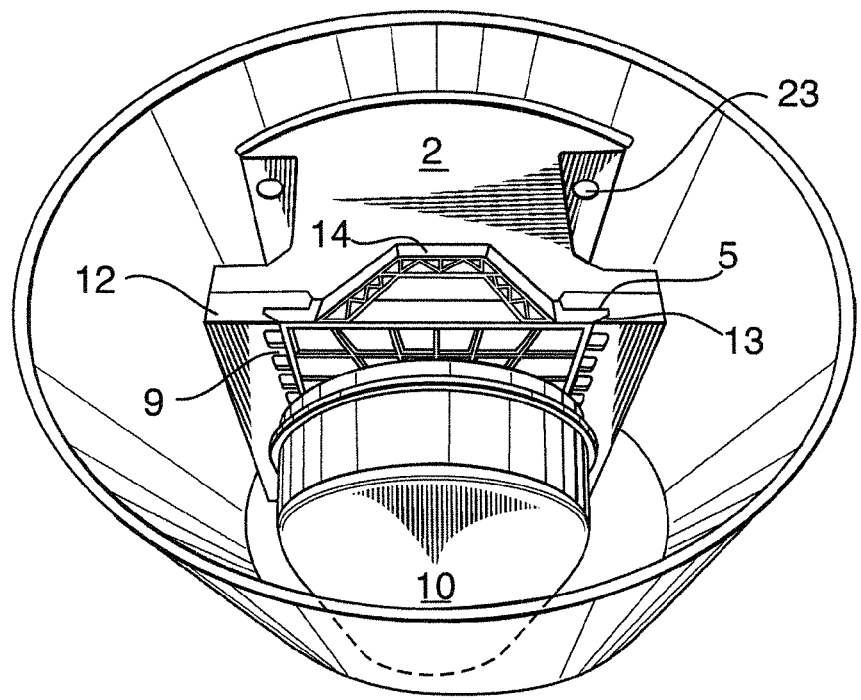
FIG. 9 is a top perspective view of the trap shown in FIG. 3, installed in a mount according to FIG. 1.
Figure 10:
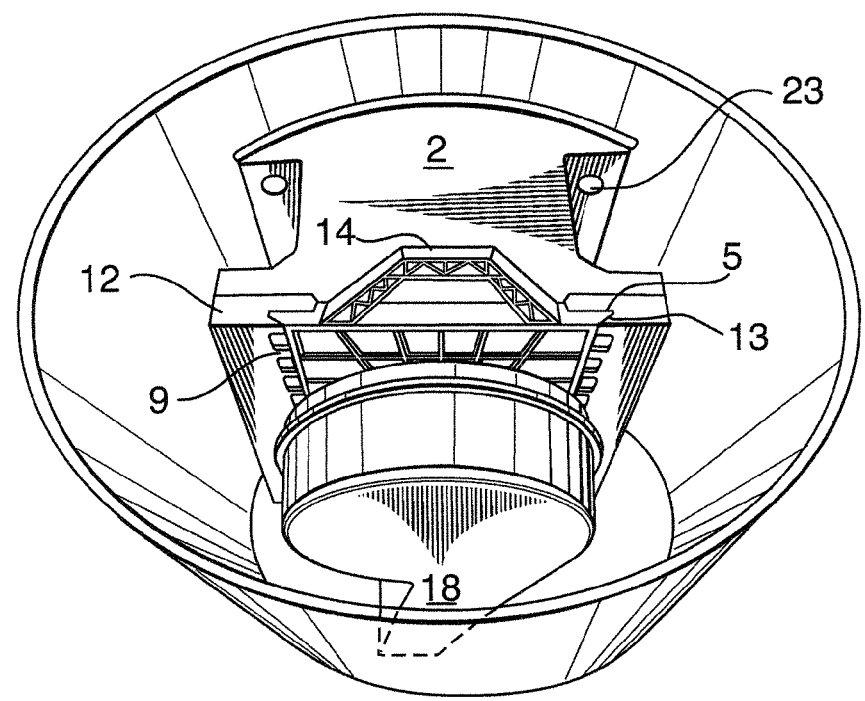
FIG. 10 is a top perspective view of the trap shown in FIG. 6, installed in a mount shown in FIG. 1.

Turning to FIGS. 3-5, a catch basin trap 10 is illustrated. Catch basin trap consists of a body 11, which is hollow, with a front wall 111, and a rear wall 112. Side walls 113, as well as a top wall 114 and a bottom wall 115 span the front 111 and rear 112. A lower aperture 15 is formed in the rear wall 112 of the trap 10.

A mounting plate 12 is connected to the front wall 111 of the trap 10 by rivets 142 in rivet holes 143. Mounting plate 12 is dimensioned to fit within retainer plate 12. In this regard the side edges 13 of mounting plate 12 are profiled to fit within grooves 5 of retainer plate 4. in the embodiment illustrated in the figures, the edges of the retaining groove are angled inwardly, and the edges of the mounting plate are angled outwardly, whereby the combination of the mounting plate 12, in place in the retaining groove 5 of the retainer plate 4 defined a dove-tail joint.

Along the upper edge of the mounting plate, a handle 14 is provided, so that service personnel can quickly and efficiently remove the trap for repair or replacement. Preferably, handle 14 is mounted to the front of plate 12, and fits into a recessed handle seat 8 formed in retainer plate 4. In this regard, the aperture 16 in the upper portion of front wall 111 of trap body 11 will align with the central aperture 6 in block body 2, when the handle is snuggly seated in handle seat 8. At that time, the gasket 7 in retainer plate will seal against the front wall 111 of body 11, around the upper aperture 16.

Moreover, mounting plate 12 may be provided with one or more detents or protrusions 131 alignable with protrusion or detent recesses 141 formed in the retaining plate, so that when the mounting plate is fully in position, it will be held tightly in place until pulled out by upward pressure on the handle 14.

Referring now to FIGS. 6-8, a different embodiment of a trap for use in the present invention is shown. The mounting plate of the FIG. 6 trap is the same as described above. The body 17 of the trap, however, consists of an upper, substantially circular chamber 18 communicating with a downwardly projection tubular chamber 18, having a downwardly open aperture 20. Lower tubular chamber 19 enters upper, circular chamber 18 substantially tangentially, so that a swirling effect is created in upper circular chamber 18 when the water level in a catch basin is high. That is, if the downwardly open aperture 20 is the only way for water to exit the catch basin, as the water level in the catch basin rises above the level of the aperture in the block body 2, which will be aligned with aperture 16 in upper circular chamber 18, and increase in water pressure in the lower tubular chamber 19 will result, and water will rush into the trap quickly. As the water exits the lower tubular chamber 19, and enters the upper circular chamber, it will follow the inner wall of the upper circular chamber 18, from the top around to the bottom, and then flow into the center aperture of the upper circular chamber 18.

FIGS. 11 and 12 illustrate a mounting plate 12 of the present invention, for attachment to a trap body. Plate 12 is provided with a flat body that as shown may be ribbed on one side, for stiffness while still being light in weight. Plate 12 has a handle 14 at its upper end, a central aperture, and rivet holes 143 for connecting the plate to a trap body. When the plate is connected to the trap body of FIG. 3, all six holes 143 may be used for rivets 142. However, when the trap body of FIG. 6 is used, only the form holes 143 around the aperture are used. Mounting plate may be injection moulded.

Retainer plate 4 is shown in FIGS. 13 and 14. It may also be injection moulded.

As noted above, it is provided with a channel 5 found between its sides 41 to accept a mounting plate 12. As can be seen in the partial perspective top view of FIG. 17, it may be ribbed on the opposite side, to achieve strength and be light weight. Channel 5 has central recesses 144 to accept corresponding protrusions 133 in the mounting plate 12, to provide a locking friction fit between the two.

Retainer plate 4 has bolt holes 145 in its four corners. These permit retainer plate to be mounted directly to a catch basin wall, with a suitable foam or rubber gasket, such as the one shown in FIG. 17, between plate 12 and the concrete wall of a catch basin. This permits the plate 4, and the present invention to be used in catch basins with flat walls.

Figure 15:
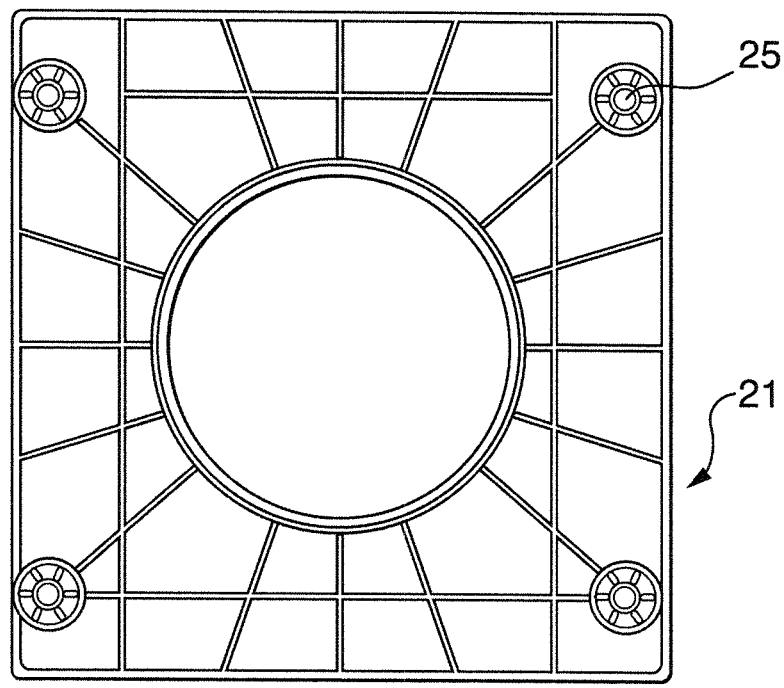
FIG. 15 is a front view of an adaptor according to the present invention.
Figure 16:
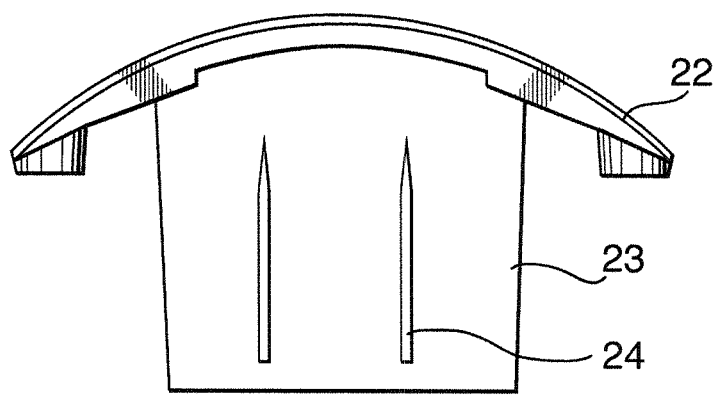
FIG. 16 is a top view of the adaptor of FIG. 15.

FIGS. 15 and 16 show an injection moulded adaptor 21 for mounting retainer plate 4 directly to a curved wall of a catch basin without block body 2, in a preferred embodiment of the present invention. Adaptor 21 has a curved front wall 22, that may be mounted to a catch basin wall, by bolts (not shown) extending through holes 25 in the corners of the front wall 22. A foam or rubber gasket 26 (see FIG. 17) is placed between the adaptor and the wall. Gasket 26 may be adhesively secured to front surface of front wall 22 of the adaptor. The other side of wall 22 is ribbed, for strength and to maintain a light weight.

Figure 17:
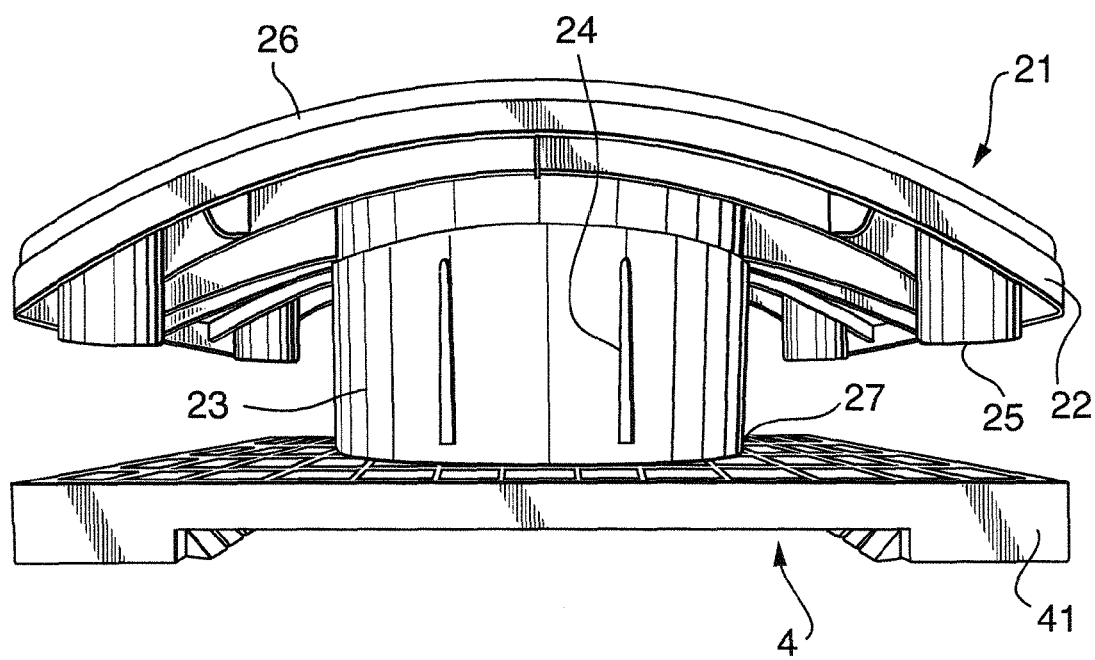
FIG. 17 is a top view of the adaptor of FIG. 15, welded to the retainer plate of FIG. 13.

Referring to FIGS. 16 and 17, a short cylindrical pipe or collar 23, moulded with front wall 22 extends rearwardly, and may be heat welded at the joint between a retainer plate 4 and collar 23. Other manes of attachment will be apparent to those skilled in the art. Collar 23 may be provided with ribs 24 for strengthening.

Lastly, it will be noted that using either of the traps 10 or 17 described above, the flow of floating debris into the storm sewer system is minimized, thereby lessening the risk of the storm sewer becoming clogged. In the case of either trap, under ordinary conditions, a water level in the catch basin between the upper and lower aperture of the trap will be maintained, thereby lessening the chance that noxious gas will escape from the catch basin. This also ensures that floating debris will not enter the lower aperture of the trap, which will be below the water level.

All components described herein may be made of suitable plastics and may be made, for instance, by injection moulding.

What is claimed is:

1. A trap for a catch basin, and means for mounting said trap to a catch basin wall, comprising:
    a hollow trap body having a front wall and rear wall, and side walls joining said front and rear walls, said trap body having a first aperture near the top of its front wall, allignable with an outlet of said catch basin, and a second aperture at a lower level on said trap body than said first aperture;
    a mounting plate secured to the front wall of said trap body, and having an aperture allignable with the first aperture of said trap body;
    a retainer plate onto which said mounting plate can be mounted, said retainer plate having an aperture allignable with the aperture on said mounting plate;
    an adaptor connected to said retainer plate, said adaptor comprising a curved panel having a radius of curvature selected to match the radius of curvature of the inside surface of catch basin, and a cylindrical collar extending rearwardly from said curved panel, to the aperture in a retaining plate, said collar being welded around its perimeter to the inner edge of said aperture in said retaining plate;
    wherein said mounting plate has side edges that converge slightly from top to bottom, and said retainer plate has a wide channel formed in its outer surface to accommodate said mounting plate, and wherein the side edges of said mounting plate and the inner edges of said channel formed in said retainer plate have complementary shaped profiles, whereby said mounting plate can frictionally engage said channel of retainer plate to remain attached thereto.

2. A trap for a catch basin, and means for mounting said trap to a catch basin wall as claimed in claim 1, wherein said mounting plate has an upper end shaped to fit in a recess formed in said retainer plate.

3. A trap for a catch basin, and means for mounting said trap to a catch basin wall as claimed in claim 2, wherein said mounting plate has a handle at its upper end.

4. A trap for a catch basin, and means for mounting said trap to a catch basin wall as claimed in claim 3, wherein said retainer plate is provided with preformed bolt holes for attaching said retainer plate to a wall of a catch basin.

5. A trap for a catch basin, and means for mounting said trap to a catch basin wall as claimed in claim 4, further comprising a gasket on an inner surface of said retainer plate.

6. A trap for a catch basin, and means for mounting said trap to a catch basin wall as claimed in claim 5, further comprising a gasket between said retainer plate and said mounting plate, around the aperture formed in said retainer plate.

7. A trap for a catch basin, and means for mounting said trap to a catch basin wall as claimed in claim 1, wherein said collar is provided with stiffening ribs on its outer surface.

8. A trap for a catch basin, and means for mounting said trap to a catch basin wall as claimed in claim 7, wherein said curved panel of said adaptor is provided with a gasket on its inner surface, and bolt holes for attachment to a catch basin.

9. A trap for a catch basin, and means for mounting said trap to a catch basin wall as claimed in claim 1, wherein said trap body is box-shaped, and said second aperture is located on the outer surface of said trap body.

10. A trap for a catch basin, and means for mounting said trap to a catch basin wall as claimed in claim 1, wherein said trap body is circular, and said second aperture is located at the lower end of a tubular member extending at an incline downwardly therefrom, at a tangent to a side edge of said body.

* * * * *